United States Patent [19]

Horber et al.

[11] Patent Number: 5,329,195

[45] Date of Patent: Jul. 12, 1994

[54] SENSOR MOTOR

[75] Inventors: Ralph W. Horber, Marshfield; Hung D. Vu, Pembroke, both of Mass.

[73] Assignee: Seiberco Incorporated, Braintree, Mass.

[21] Appl. No.: 970,049

[22] Filed: Nov. 2, 1992

[51] Int. Cl.⁵ .......................................... H02K 11/00
[52] U.S. Cl. ..................... 310/68 B; 318/254
[58] Field of Search ............... 310/68 B, 179, 187, 310/254; 318/138, 254

[56] References Cited

U.S. PATENT DOCUMENTS

| | | | |
|---|---|---|---|
| 3,319,104 | 5/1967 | Yasuoka et al. | 318/254 |
| 3,453,512 | 7/1969 | Polakowski | 318/138 |
| 3,501,664 | 3/1970 | Veillette | 318/138 |
| 3,541,407 | 11/1970 | Lahde | 318/138 |
| 3,590,353 | 6/1971 | Kobayashi | 318/254 |
| 3,679,953 | 7/1972 | Bedford | 318/138 |
| 3,683,248 | 8/1972 | Kobayashi et al. | 318/138 |
| 3,794,895 | 2/1974 | Coupin et al. | 318/254 |
| 3,903,463 | 9/1975 | Kanamori | 318/138 |
| 3,997,823 | 12/1976 | Machida | 318/138 |
| 4,096,420 | 6/1978 | Gosling et al. | 318/254 |
| 4,162,435 | 7/1979 | Wright | 318/138 |
| 4,262,237 | 4/1981 | Gelenius | 318/254 |
| 4,297,622 | 10/1981 | Dittman et al. | 318/254 |
| 4,481,440 | 11/1984 | Müller | 310/268 |
| 4,495,450 | 1/1985 | Tokizaki et al. | 318/138 |
| 4,551,658 | 11/1985 | Rhee | 318/254 |
| 4,687,961 | 8/1987 | Horber | 310/186 |
| 5,032,750 | 7/1991 | Hayashi | 310/68 B |

OTHER PUBLICATIONS

"Multiple-Pole Stepping Motor"-Ted T. Lin—Rotorque Technology Corp., Milpitas, Calif., pp. 381–390.

*Primary Examiner*—Steven L. Stephan
*Assistant Examiner*—Matthew Nguyen
*Attorney, Agent, or Firm*—Ira S. Dorman

[57] ABSTRACT

A polyphase brushless DC motor has an integral automatic feedback arrangement affording excellent accuracy and a high degree of magnetic balance. The stator pole elements of the motor are identical and equidistantly spaced, and each is wound with two coils. One coil on each pole element comprises sensor circuitry; the other comprises power circuitry. As a result, all pole elements of the stator are utilized both to produce rotor drive torque and also to generate electrical signals that provide highly accurate rotor-position information.

18 Claims, 4 Drawing Sheets

SENSOR MOTOR

BACKGROUND OF THE INVENTION

This invention relates to brushless DC motors having position sensing capability.

Electrical servo systems are widely utilized for many different applications in which position control is necessary; typically, they are used to drive robots and X-Y tables, to position mirrors for laser applications and gun turrets, in integrated circuit production equipment, and the like. Primary criteria for such systems are of course high precision and responsiveness to input commands, as well as economy and facility of manufacture, reliability and durability.

Stepper motors have been used for such motion control applications, and are advantageous from the standpoint of providing high stiffness and positioning capability, coupled with comparatively low cost and relative simplicity. However, they do not generally offer optimal dynamic characteristics and, because of the absence of feedback capability, elements of uncertainty are inherent.

Closed loop DC servo motor systems provide considerable dynamic performance benefits, including speed range, acceleration, torque-to-inertia ratios, and frequency response; however, they tend to be deficient in static performance characteristics. Moreover, the feedback devices employed in such servo motor systems for the extraction and utilization of information for commutation, and for speed and position control (e.g., shaft angle position detectors, tachometers encoders and resolvers), are expensive, tend to be fragile in some instances, and may give rise to unreliability. In general, systems of this kind are relatively complex and troublesome to install and maintain.

U.S. Pat. No. 4,687,961, which issued on Aug. 18, 1987 to Ralph W. Horber, provides a motion control system, and a brushless DC motor for use therein, which are relatively incomplex and inexpensive to manufacture, which afford a highly desirable balance of accuracy of rotor-position information, speed and torque characteristics, and which are highly effective, efficient and reliable in and for their intended purposes. The motor operates in a closed-loop mode without need for any added feedback device.

It is of course desirable to increase accuracy and improve other operating characteristics in any such apparatus. Accordingly, it is the broad object of the present invention to provide an improved brushless DC motor of the kind described and claimed in the above-identified Horber patent, in which the accuracy of the feedback signal is increased substantially.

Additional objects of the invention are to provide a motor having the foregoing features and advantages, which is highly responsive to commands, which enables extraction of exact rotor position information at standstill and has a very large number of angular resolution points to provide extremely precise position information, and which generates increased torque and has very smooth running, and full power starting, torque characteristics.

The prior art shows a wide variety of systems and motors, some of which may be employed for motion control applications and may have certain of the features hereinabove discussed, as indicated by the following United States patents:

Polakowski U.S. Pat. No. 3,453,512 provides a brushless DC motor which employs silicon controlled rectifiers in the armature switching circuits, the turn-on signal being generated by an angular position detector and the turn-off signal being generated by a capacitor. The position detector may consist of a series of stationary coils which are sequentially inductively coupled, by a member mounted to rotate with the field structure, with a common coil.

In Veillette U.S. Pat. No. 3,501,664, a system is disclosed for regulating a DC motor having an internal stator field that is rotated in space 90° ahead of the rotor field. The stator has teeth on its inner periphery arranged in non-diametrically oriented pairs, which carry secondary windings through which current, applied through a primary winding on the main body of the stator, is transferred sequentially as the rotor poles align with the teeth during rotation.

The DC motor taught by Lahde U.S. Pat. No. 3,541,407 utilizes two-terminal field coils as both a pickup, to sense the position of the rotor, and also as a power coil to provide driving torque.

Kobayashi et al U.S. Pat. No. 3,590,353 shows an electronically commutated motor having an outside and an inside rotor positioned on a common shaft, the inside rotor serving a position detecting function. Primary and secondary windings on an internal detecting stator are variable electromagnetically coupled, depending upon the position of the rotor.

A phonograph turntable, driven directly by an electrically controlled, variable speed brushless DC motor, is shown in Kobayaski et al U.S. Pat. No. 3,683,248. Winding pairs within the stator are selectively coupled, depending upon the position of an internal position detector rotor, to control current flow through particular outer stator windings to drive an external rotor.

In Coupin et al U.S. Pat. No. 3,794,895, an electronically commutated DC motor is described in which the stator is wound with pairs of power and detector coils, the latter providing a speed-dependent signal which is dephased by 90° for control of the power amplifier.

A self-exciting DC motor, having means for preventing rotation in one direction, is disclosed in Kanamori U.S. Pat. No. 3,903,463. The stator poles are wound with both field and armature coils, and the position detecting elements include cores that are magnetically saturated by a permanent magnet and high frequency coils.

Machida U.S. Pat. No. 3,997,823 teaches a circuit for a brushless DC motor, in which the stator employs star-connected fixed windings. Means is provided for detecting position signals induced in the fixed windings by rotation of the rotor, which signals are employed to control switching means for supplying driving current to at least one of the windings.

In Gosling et al U.S. Pat. No. 4,096,420, an oscillator with an LC resonance circuit is employed in the control circuit for a brushless DC motor, oscillation of the oscillator being modulated in response to induction caused in a sensing coil by the rotor field.

Wright U.S. Pat. No. 4,162,435 discloses a circuit for a brushless DC motor, wherein the voltage induced across one unenergized winding is sampled, integrated and compared to a predetermined, position-indicating voltage to derive a control signal while at least one other winding is energized, for selective commutation.

A commutatorless DC motor drive system is provided by Gelenius U.S. Pat. No. 4,262,237, in which a permanent magnet rotor induces AC potential waveforms in phase displaced stator phase windings. Means is provided for initiating rotor rotation from standstill, to initially induce the potential waveforms in the stator phase windings, means is provided for producing a switch point reference signal, and means responsive to the induced waveforms is provided for sustaining rotor rotation by sequentially completing and interrupting individual stator phase winding energizing circuits, in controlled relation to the reference signal.

Dittman et al U.S. Pat. No. 4,297,622 discloses a two phase gyrosystem which employs two series-connected, motion-sensing reference coils, located 180° apart, for motor drive and control.

A brushless DC motor is disclosed in Muller U.S. Pat. No. 4,481,440 which utilizes a permanent magnet rotor in which the poles, viewed in the direction of rotation, have approximately rectangular or trapezoidal magnetization curves. The harmonic fields included in such poles induce voltages in a sensor winding of the stator which corresponds to the harmonic wave for which the winding is dimensioned.

A control device for a brushless DC motor is taught in Tokizaki et al U.S. Pat. No. 4,495,450. It has a rotor position detecting circuit in which voltages induced in stator coils by rotation of the rotor are compared to neutral voltage at a virtual neutral point to detect polarity changing points. Based thereupon, an invertor controls the conducting modes of the stator coils to control rotation of the motor.

The DC motor of Rhee U.S. Pat. No. 4,551,658 includes brushes and a commutator. After starting, the brushes are centrifugally displaced from the commutator to break the starting circuit.

In June of 1985, an article entitled "Multiple-Pole Stepping Motor" was published. It described a hybrid stepping motor wound for two-phase operation, wherein every two adjacent poles of each group are connected in series, but for opposite polarity.

SUMMARY OF THE INVENTION

It has now been found that certain of the foregoing and related objects of the invention are readily attained by the provision of a polyphase, direct current electric motor or the like, which comprises a stator of magnetic material having a generally cylindrical body portion and a multiplicity (i.e., a number no smaller than eight, and usually divisible by either four or six) of identical pole elements extending radially from locations spaced about the body portion. Both a sensor coil and a phase coil are wound about each pole element. The sensor coils are arranged as equal-number sets of at least four series-connected coils, with the coils of a first set wound on a first set of associated pole elements, and with the coils of a second set wound on a second set of associated pole elements, the pole elements of the two sets alternating with one another in positions about the body portion. Each set of stator coils and associated pole elements are subdivided into equal-number subsets of at least two coils and pole elements, the pole elements of each subset preferably also alternating with one another in positions about the stator body portion. Sensor means of the motor has at least two electrical circuit legs, one connected to the "first" set of coils, at a first junction between the subsets thereof, and the other connected to the "second" set of coils, at a second junction between its subsets. The sensor means-connected coils thus adapt the associated pole elements to function as sensor poles, providing at least two sensor channels for the generation of signals indicative of the angular orientation of an associated rotor, the signals constituting averaged values of electrical effects produced simultaneously upon a plurality of pole elements.

Power supply means is connected to the phase coils of the motor, for providing at least two phases of current; one circuit portion of the power supply means connects in series a first group of the phase coils, wound about a first group of pole elements, for energization by one phase of current, while another portion connects in series the second group of phase coils, wound about a second group of pole elements, for energization by a second phase of current. The total number of pole elements divided by the number of phases must be an even number, and the circuit portions of the power supply means adapt the pole elements to function as first and second phase torque poles, respectively.

In preferred embodiments, all of the sensor coils of the "first" set will be wound in the same direction, and all of the sensor coils of the "second" set will be wound in the opposite direction; each sensor coil will normally be connected directly to a sensor coil other than the one that is mechanically most proximate to it. For maximum signal quality, the sensor coils will be disposed adjacent the innermost ends of the pole elements, as close as possible to the rotor magnets. The phase coils may be disposed radially outwardly of the sensor coils; they may be wound to overlap, or indeed to fully overlie, the associated sensor coils. The phase coils will preferably be arranged as pairs on directly adjacent pole elements, with the members of each pair wound in opposite directions to thus magnetically couple the adjacent pole elements of one phase when the phase coils thereon are energized. The pairs of coupled pole elements of the "first" and "second" groups will desirably alternate about the body portion, and the directly adjacent pole elements will most desirably constitute one first-set pole element and one second-set pole element. The pole elements will normally be equidistantly spaced from one another; e.g., when there are 24 such pole elements they will be spaced by 15° mechanical.

In certain embodiments the motor will additionally include an armature, usually in the form of a rotor comprising a cylindrical body with an array of circumferentially disposed pole elements; the stator pole elements will of course define a space for receipt of the armature. The power supply means employed will in most instances provide two phases of current, in which case the rotor pole elements will be permanent magnets disposed on its outer surface and having polarities that alternate in the array, the ratio of the number of stator pole elements to rotor pole elements being either 4:3 or 4:5. In an optimal, two-phase motor configuration, the stator will have 24 pole elements and the rotor will have 18 magnet elements thereon. When the power supply means provides three phases of current, however, the rotor pole elements will be either permanent magnets or steel poles, and the ratio of the number of stator pole elements to rotor pole elements will desirably be 3:2.

Broad objects of the invention are attained by the provision of a motor having a stator of magnetic material, as described, and a sensor coil and a phase coil wound about each pole element of the stator. Sensor means is operatively connected to all of the sensor coils, for receiving an electrical signal therefrom indicative of the relative position of an associated rotor or other armature, and power supply means is operatively connected to all of the phase coils for generating forces for driving the armature.

DETAILED DESCRIPTION OF THE ILLUSTRATED EMBODIMENT

Figure 1:
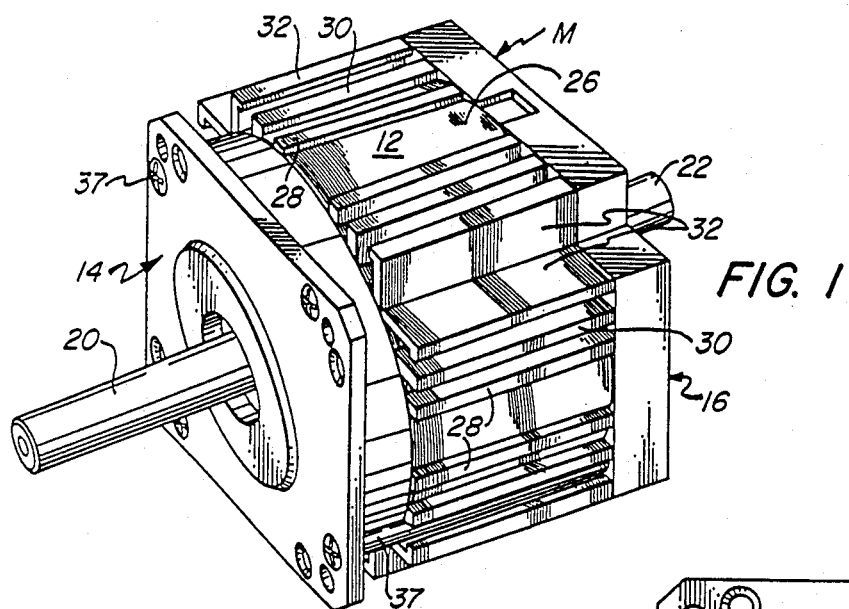
FIG. 1 is a perspective view of a motor embodying the present invention.
Figure 3:
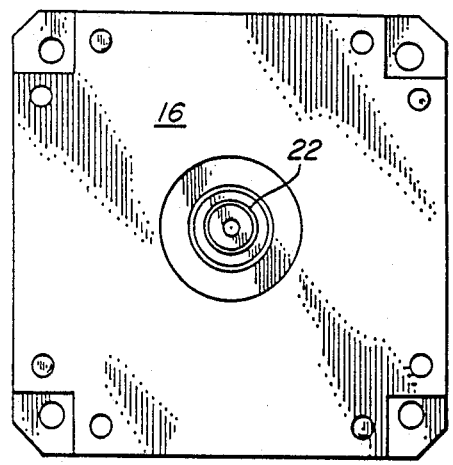
FIGS. 2, 3 and 4 are front, rear and side-elevational views of the motor.
Figure 2:
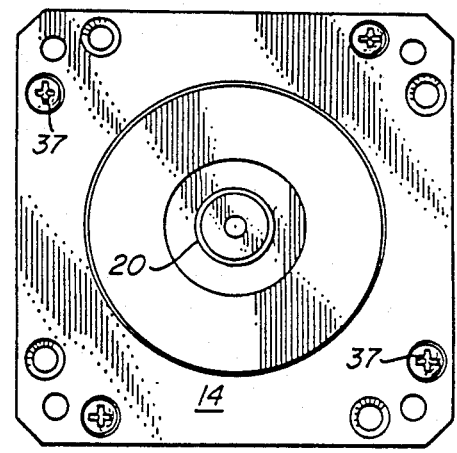
Figure 4:
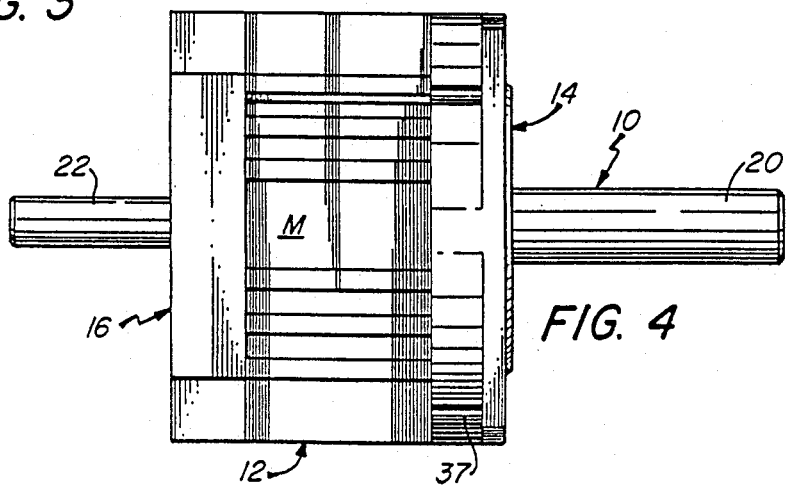
Figure 5:
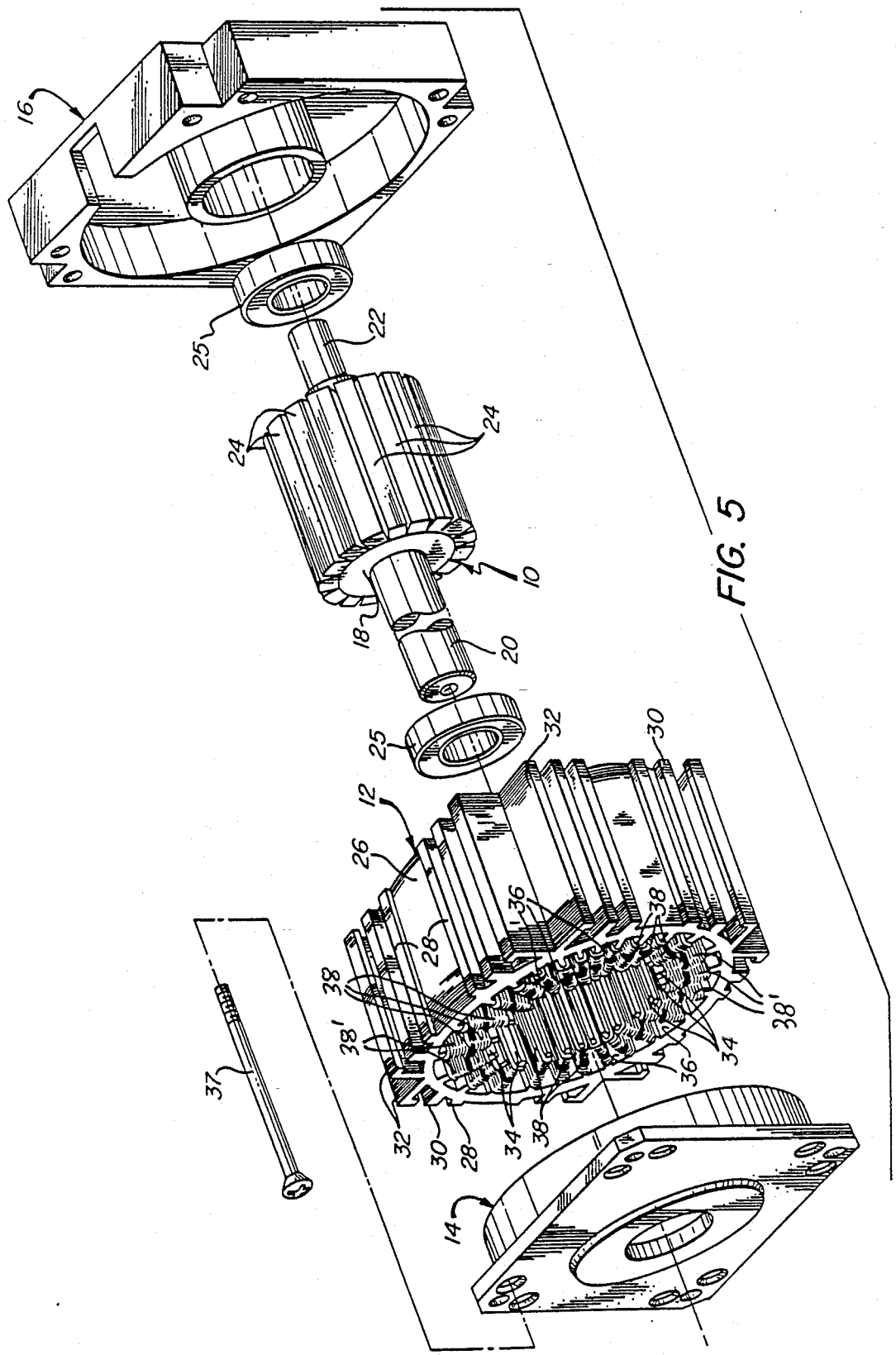
FIG. 5 is an exploded perspective view thereof.

Turning now in detail to FIGS. 1 to 7 of the appended drawings, therein illustrated is a brushless DC motor, generally designated by the letter "M", embodying the present invention. It consists of a permanent magnet rotor, generally designated by the numeral 10, a stator, generally designated by the numeral 12, and front and rear end caps, generally designated respectively by the numerals 14 and 16. The rotor consists of a cylindrical core 18 with axial shaft portions 20, 22, and an array of high energy permanent magnets 24 secured (such as by adhesive bonding) on the surface thereof and extending longitudinally (axially) therealong; the magnets are disposed with their polarities alternating in the array, and will advantageously be made of a samarium/cobalt alloy. Suitable bearings 25 are mounted within the end caps 14, 16, and serve to receive the opposite end portions 20, 22 of the shaft for rotatably supporting the rotor 10, in a conventional fashion.

Figure 6:
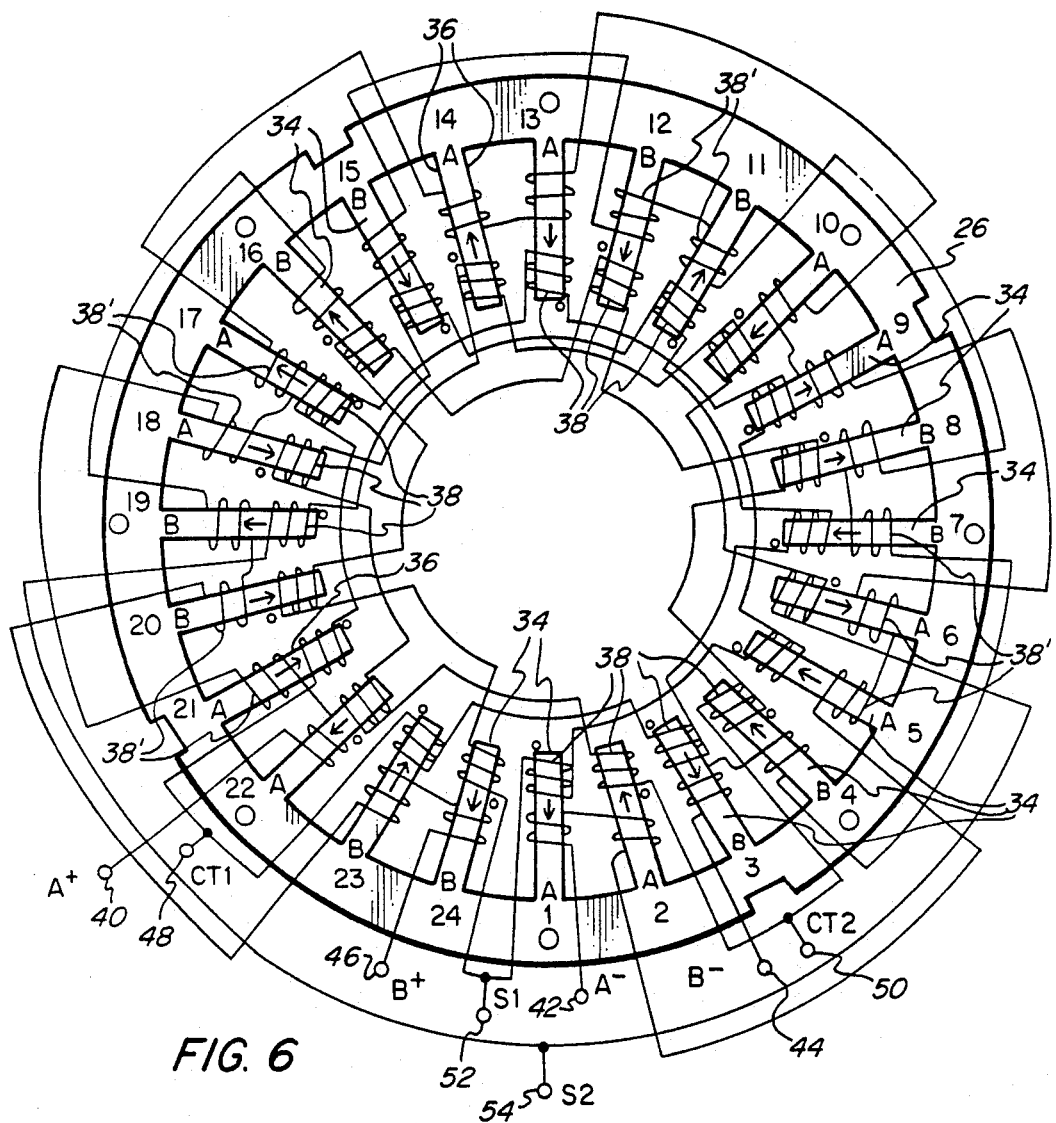
FIG. 6 is an end view of the stator of the motor drawn to an enlarged scale, with the wiring schematically illustrated.
Figure 7:
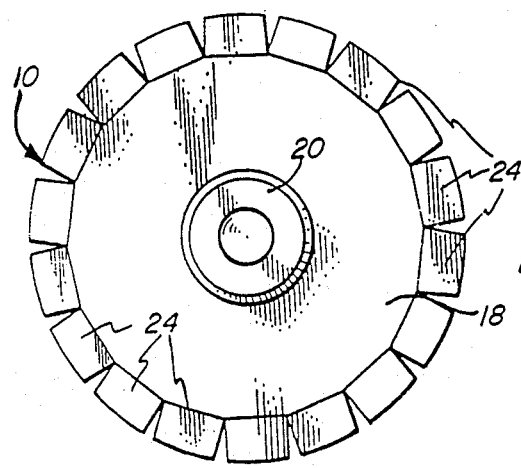
FIG. 7 is an end view of the rotor of the motor drawn to substantially the scale of FIG. 6.

The stator 12 is comprised of numerous laminae of punched or stamped steel fabrication, the configuration of which is indicated in FIG. 6 (although characterized as an end view of the stator, the FIG. may also be considered to show the structure of an individual laminae). As can be seen, the laminae consist of an annular body element 26, with 24 pole elements 34 extending radially inwardly therefrom at equidistantly spaced locations about its inner circumference; each laminae is of course of one-piece, integrally formed construction. The pole elements 34 are of rectangular configuration and, as a result, define slots 36 therebetween which are relatively wide at the base and taper in a radially inward direction. As will be appreciated, the stacked laminae 24 cooperatively provide the poles 34 of the stator (for convenience, the parts of the stator and the elements of the laminae from which they are formed are given the same numbers); the poles are of substantially rectangular configuration in both their axial and also their transverse planes, and thus they have a single thickness dimension and a single axial length dimension, at all points taken along their radial length. Although shown only in FIGS. 1 and 5, the lamina may cooperatively define longitudinally extending ribs 28, 30, 32, to serve as integral radiators for dissipation of the heat that is built up during operation of the motor; the ribs are dimensioned and configured to afford sufficient surface area for efficient heat transfer, while lying substantially entirely within the corner areas defined between the outer circumference of the stator body portion 26 and an imaginary square figure disposed thereabout and having a side dimension equal to the diameter thereof. Four long bolts 37 extend through apertures in the front end cap 14 and are secured within tapped openings in the rear cap 16, to hold the parts in assembly.

Each pole 34 of the stator 12 has two coils 38, 38' disposed adjacently thereupon and insulated therefrom with paper or a synthetic resinous material, in a conventional manner. The coils 38, 38' are wound and interconnected as schematically shown in FIG. 6.

More particularly, it can be seen that there are two sensor circuit legs, designated CT1 and CT2, which are electrically parallel to one another and join at the junctions designated S1 and S2. All coils 38 of the set comprising the circuit leg CT1 are wound in one direction upon the odd-numbered stator poles 34, and all of the coils 38 comprising the circuit leg CT2 are wound in the opposite direction upon the even-numbered poles. Thus, the sensor coils of the two sets produce oppositely directed magnetic fluxes, as indicated by the positions of the small circles adjacent either the outer or the inner end of the coil winding.

The junctions at which the terminals 48 and 50, for CT1 and CT2 sensor circuit legs, respectively, are connected effectively subdivide each set of sensor coils 38 into two, equal-number subsets. In addition to having the poles of each sensor coil set alternatingly interposed with one another, it can be seen that the poles of each coil subset also alternate with one another about the stator body.

With regard to the phase, or torque coils 38', those wound on the poles numbered 1, 2, 5, 6, 9, 10, 13, 14, 17, 18, 21 and 22 are connected in series as a first phase, designated "A" and those wound on the remaining poles are interconnected as a second phase, designated "B". Thus, the poles of each phase group are arranged as adjacent pairs, and the phase coils 38' on the paired poles are wound in opposite directions so as to cause the magnetic flux to follow a path through the pairs of poles when the phase is energized, thus magnetically coupling them.

It will be appreciated from the foregoing that the wiring of the stator described adapts each pole to function as a torque pole and a sensor pole. The particular arrangement illustrated affords optimal magnetic balance in both the power and the sensing functions of the motor, when the stator is connected to operate on two phases of equal voltage and to provide two-channel feedback signals, in addition to affording extremely high levels of resolution of rotor position and hence exceptionally accurate position information.

Figure 8:
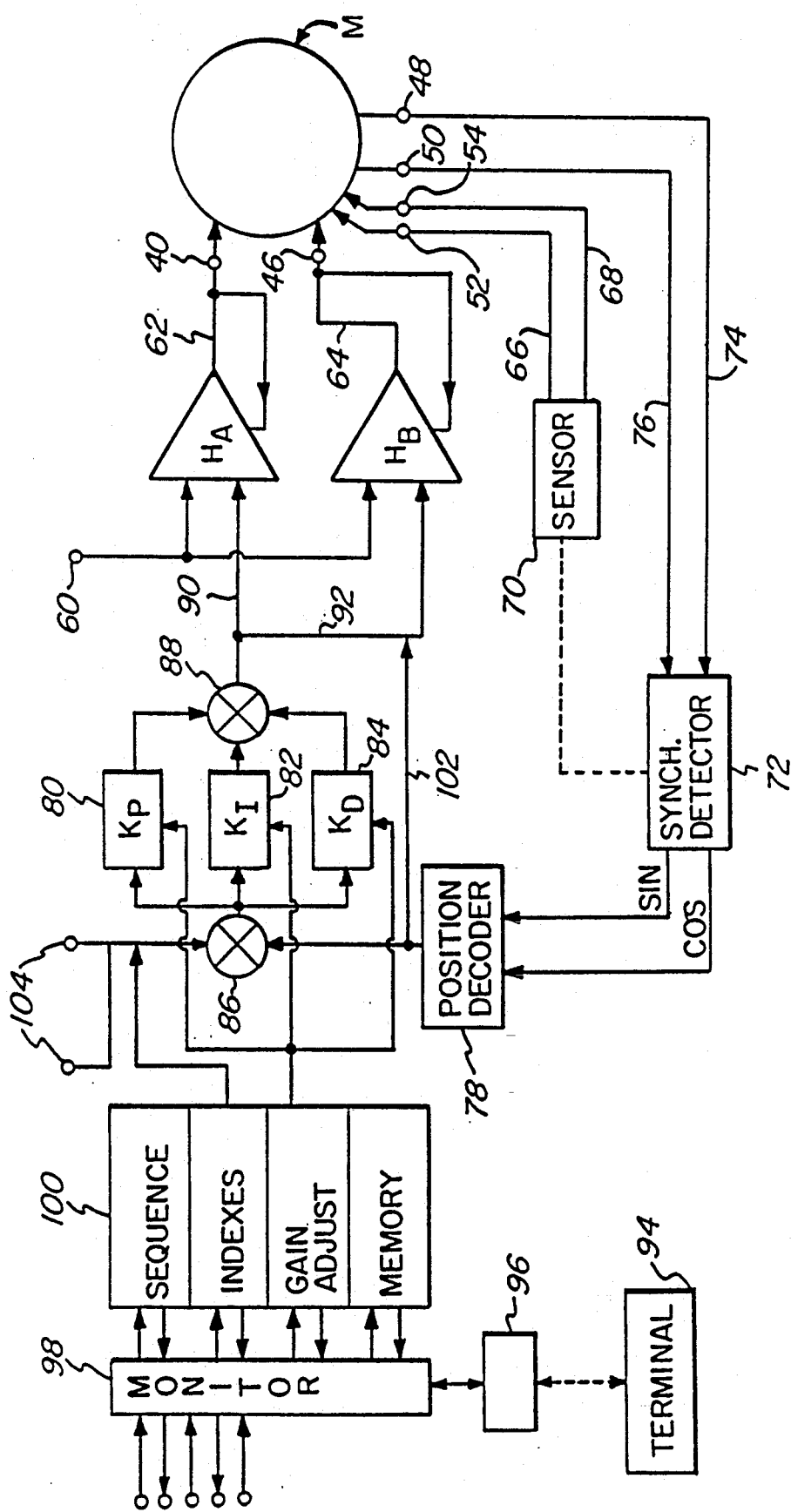
FIG. 8 is a diagrammatic representation of a novel motion control system utilizing the motor of the present invention.

FIG. 8 constitutes a functional block diagram of a system employing the instant motor. Power for the motor M is provided by an amplifier, which operates on DC voltage applied to the power terminal 60 and ground connections (not shown), and which is comprised of an H-bridge for each phase, designed $H_A$ and $H_B$, connected respectively through lines 62, 64, and having current-regulating minor loops, as illustrated; the H-bridges will advantageously employ power field effect transistors, and will typically be operated at 50 KHz chopping frequency.

The terminals 52, 54 for the sensor channels of the motor are connected through lines 66, 68 to a DC powered sensor 70, which may also take the form of an H-bridge and will typically operate at a predetermined constant frequency of 100 KHz to supply an alternating current to the pairs of sensor coils of the two channels, CT1 and CT2, respectively. The sensor 70 is synchronized with the synchronous detector 72, which is connected through lines 74, 76 to terminals 48 and 50 of the motor M and performs inversion functions upon the signals from the sensor channels, to provide single-level voltages of varying amplitude to a position decoder 78, the latter normally being a function of a microprocessor controller integrated into the system. The microprocessor also perform gain adjustment functions for standard PID controllers 80, 82, 84, and provides an indexing signal which is summed at the junction 86 with the vector signal from the position decoder 78, for input to the controllers. The signal from the output summing junction 88 controls the H-bridges $H_A$ and $H_B$, through lines 90 and 92, for coil energization and pulse-width modulation appropriate to produce desired operation of the motor, depending upon rotor position and the command signals input into the system from the control terminal 94, through the interface port 96 and the microprocessor monitoring, sequencing, indexing, gain adjustment and memory functions 98, 100. Line 102 establishes a commutation loop from the position decoder 78 to the H-bridges, and terminals 104 are provided to accommodate external indexing, if so desired.

As will be appreciated, the amplitude of the voltages detected at terminals 48 and 50 will depend upon the inductance of the sensor coils 38, in turn providing an indication of magnetic flux in the poles, as affected by the rotor magnets. Because of the geometry of the stator and rotor poles, and the timing of H-bridge switching, the signals from the sensor channels will vary as the rotor turns, and will be 90° electrical out-of-phase to represent sine and cosine functions of the rotor angle; this will enable generation of a vector signal by the position decoder that is indicative of the actual angular position of the rotor. Moreover, because each signal will effectively represent an averaging of the effects of the rotor magnets upon six stator poles (rather than upon only one, as in the motor previously described in the identified Horber patent) the construction and magnetic configuration of the rotor and stator permit extremely high angular resolution and hence accuracy of positioning. A position error value less than ±8 arc-minutes has been achieved with an exemplary motor constructed as hereinafter described and employed in combination with a driver of suitable design.

As will also be appreciated, the microprocessor of the system will determine, from the information obtained through the integrated feedback system of the motor, precise distances of travel from a home position. By controlling power supplied to the phases through the H-bridge circuits, control of motor speed, as necessary to carry out operational commands, is also afforded.

Although a two-phase system has been illustrated, it will be understood that the concepts of the invention are equally applicable to other polyphase systems; specific modifications will of course have to be made, as will be apparent to those skilled in the art. For example, rather than configuring the rotor and stator to generate signals in the sensor channels that are 90° out-of-phase, for a three-phase system the signals would be 60° electrical out of phase and three channels (comprised of at least four sensor poles per channel) would be provided as a matter of preference, albeit that the provision of only two channels is feasible and would be less expensive. Also, while the number of stator poles for a two phase motor must total at least eight and be divisible by four, for three-phase operation the number must total at least 12 and will preferably be divisible by 6; in both cases however the quotient of the number of poles divided by the number of phases must be an even number.

In addition to the foregoing, it has been found that the numerical relationships that exist between the stator and rotor poles of motors embodying the invention must conform to certain criteria. More particularly, the stator pole:rotor pole ratio in a two-phase motor must be either 4:3 or 4:5; whereas in a three-phase motor it must be 3:2; Table One below sets forth illustrative combinations of numbers of stator and rotor poles, reflecting these relationships:

TABLE ONE

| Stator Poles | Rotor Poles | |
|---|---|---|
| | Two-Phase | Three-Phase |
| 8 | 6 or 10 | — |
| 12 | — | 8 |
| 16 | 12 or 20 | — |
| 18 | — | 12 |
| 24 | 18 or 30 | 16 |
| 30 | — | 20 |
| 32 | 24 or 40 | — |
| 36 | — | 24 |
| 40 | 30 or 50 | — |
| 32 | — | 28 |

Despite the foregoing, in most instances the minimum total number of stator poles will generally be 24, since that will normally provide optimal magnetic balance and performance in a two-phase motor system.

It is of course also desirable that the motor be of a physically symmetrical nature, again to provide optimal magnetic balance. As can be seen, the illustrated stator is highly symmetric, physically as well as in all magnetic functions. Although the circuit arrangement of phase and sensor coils shown in the drawings is preferred, other arrangements are possible. For example, the sensor coils of the sets and subsets described might be grouped together rather than being interpositioned and wound as shown; however, the magnitude and accuracy of the feedback signal would be compromised as a result, and undesirable phase shifts can occur.

Especially important advantages of the present motor stem from the fact that it employs all of the pole elements as torque poles, thus maximizing power output, and because it employs coupled torque poles that are located directly adjacent to one another. Flux paths are very short as a result and there is no crossing of the fluxes of the different phases, which factors in turn minimize magnetic losses and attenuation due to phase interaction, and thereby maximize the efficiency of operation. The use of high energy magnets for the rotor poles, and their close proximity to the stator poles, also aid the development of high torque values and low inductances. As to pole geometry, the confronting faces of the rotor poles will generally be wider than the faces of the stator poles, but narrower than the distance across two adjacent poles including the gap therebetween.

Motors embodying the invention are characterized by torque/speed curves that are virtually flat throughout the major portion of their speed range, and this is true under both continuous and also intermittent duty conditions. They are also constructed to provide cycle counts of 8–20 electrical cycles per revolution of the rotor, to afford an optimal balance of accuracy, speed and torque. Cycle counts of six or less provide levels of sensor accuracy that would be inadequate for most applications for which the motors and systems of the invention are intended, and motors with counts of 25 or more will generally be too slow.

An exemplary motor embodying the invention has been produced, and was constructed, wired and controlled as hereinabove described and illustrated. It had a 24-pole steel laminate stator approximately 2¼ inches (5.7 centimeters) square in transverse exterior cross-section, and employed an 18 pole, samarium/cobalt alloy permanent magnet rotor of approximately 1 3/16 inch (3 centimeters) diameter; its axial length (taken as the combined length of the stator and end caps), was 2 inches (5.1 centimeters).

In operation, the motor exhibited a position resolution of 0.02 degree; with suitably modified software for the microprocessor, it is expected that the angular resolution could be made even more precise. This level of accuracy can be compared with the excellent value of 0.15625 degree, which is reported in the above-mention Horber patent for an otherwise comparable motor having only four sensor poles. The instant motor also exhibits a peak torque (system) value, at the specified operating temperature of 85° Centigrade, of 105 ounce-inches, a no-load speed of 6000 RPM (with 150 volts DC applied to the H-bridges, and an average terminal inductance of 0.05 millihenry), a rotor inertia value of 0.00176 ounce-inch-second, and a terminal resistance of 4.0 ohm.

Finally, it will be appreciated that the control functions for the motor will generally be entirely digital and integrated into the systems. In addition to the other self-evident benefits of such construction, the fully integrated construction facilitates self-tuning or "expert" operation, thereby rendering the system of the invention especially well suited for certain applications, such as robotics and the like.

Thus, it can be seen that the present invention provides a novel and improved brushless DC motor which is relatively incomplex and inexpensive to manufacture, which affords a highly desirable balance of accuracy, speed and torque characteristics for precise positioning capability, in which chopping noise and induced voltages are minimized, and which is highly efficient, effective and reliable for its intended purposes. The motor operates in a closed loop feedback mode, employing internal features that are capable of providing signals of large magnitude and exceptional accuracy, the latter being due primarily to the effective averaging of feedback signals over multiple poles, thus compensating for magnet heterogeneity, and to the increased correspondence that is achieved between the mechanical and magnetic motor axes. In addition, the motor is highly responsive to commands, it enables extraction of exact rotor position information at standstill and has a large number of angular resolution points to provide very precise position information, and it exhibits increased torque and very smooth running, and full power starting, torque characteristics.

Having thus described the invention, what is claimed is:

1. In a polyphase, direct current electric motor or the like, the combination comprising: a stator o f magnetic material comprising a generally cylindrical body portion and a multiplicity of at least eight identical pole elements extending radially from said body portion at locations spaced thereabout, and a sensor coil and a phase coil wound about each of said pole elements, said sensor coils being arranged as equal-number sets of at least four series-connected coils, with said coils of a first set being wound on a first set of associated pole elements and said coils of a second set being wound on a second set of associated pole elements, said pole elements of sad first and second sets alternating in positions about said body portion of said stator, each of said sets of stator coils and associated pole elements being subdivided into equal-number subsets of at least two coils and pole elements; sensor means having at least two electrical circuit legs, one of said circuit legs being connected to said first set of coils, at a first junction between said subsets thereof, and the other of said two circuit legs being connected to said second set of coils, at a second junction between said subsets thereof, said first and second sets of coils adapting said associated pole elements to function as sensor pole elements, providing at least two sensor channels for the generation of signals indicative of angular orientation of a rotor assembled with said stator, said signals constituting averaged values of electrical effects produced simultaneously upon a plurality of pole elements; and power supply means connected to said phase coils for providing at least two phases of current, said supply means having one circuit portion connecting a first group of said phase coils wound about a first group of said pole elements in series for energization by one phase of current, and having another circuit portion connecting a second group of said phase coils wound about a second group of said pole elements in series for energization by a second phase of current, said one and another circuit portions of said supply means, so connected, adapting said pole elements to function as first and second phase torque pole elements, respectively, the total number of sad pole elements on said body portion divided by the number of phases provided by said power supply means being an even number.

2. The motor of claim 1 wherein all of said sensor coils of said first set are wound in the same direction, and wherein all of said sensor coils of said second set are wound in the opposite direction.

3. The motor of claim 2 wherein each of said sensor coils is connected directly to a sensor coil other than the one that is mechanically most proximate to it, and wherein said pole elements of one of said subsets of each set alternate, in positions about said body portion of said stator, with said pole elements of the other subset of the same set.

4. The motor of claim 1 wherein said sensor coils are disposed adjacent the innermost ends of said pole elements.

5. The motor of claim 4 wherein said phase coils are disposed radially outwardly of said sensor coils on said pole elements.

6. The motor of claim 1 wherein said phase coils are arranged as pairs, with the members of each pair wound on pole elements that are disposed directly adjacent one another, said members of each pair of phase coils being wound in opposite directions to magnetically couple said directly adjacent pole elements when said phase coils thereon are energized.

7. The motor of claim 6 wherein one of said directly adjacent pole elements constitutes a first-set pole element, and the other of said directly adjacent pole elements constitutes a second-set pole element.

8. The motor of claim 6 wherein said coupled pole elements of said first group alternate, about said body portion of said stator, with coupled pole elements of said second group.

9. The motor of claim 1 wherein said sensor means has two circuit legs, and wherein said power supply means provides two phases of current.

10. The motor of claim 1 wherein said pole elements are equidistantly spaced from one another on said stator body portion.

11. The motor of claim 10 wherein said pole elements are spaced by 15° mechanical, there being 24 of said pole elements thereon.

12. The motor of claim 1 wherein said pole elements extend inwardly from said stator body portion to define a space for a rotor therewithin.

13. The motor of claim 12 additionally including a rotor comprising a cylindrical body with an array of pole elements circumferentially disposed thereon.

14. The motor of claim 13 wherein said rotor body is a core having said pole elements of said rotor disposed on the outer surface thereof.

15. The motor of claim 14 wherein said power supply means provides two phases of current, and wherein said rotor pole elements are permanent magnets the polarities which alternate in said array, the ratio of the number of said stator pole elements to said rotor pole elements being either 4:3 or 4:5.

16. The motor of claim 15 wherein said stator has 24 of said pole elements and said rotor has 18 of said magnet elements thereon.

17. The motor of claim 14 wherein said power supply means provides three phases of current, and wherein said rotor pole elements are either permanent magnets or steel poles, the ratio of the number of said stator pole elements to said rotor pole elements being 3:2.

18. In a polyphase, direct current electric motor or the like, the combination comprising: a stator of magnetic magerial comprising a body portion and a multiplicity of at least eight identical pole elements extending outwardly from said body portion at spaced locations, and a sensor coil and a phase coil wound about each of said pole elements, said sensor coils being arranged as equal-number sets of at least four series-connected coils, with said coils of a first set being wound on a first set of associated pole elements and said coils of a second set being wound on a second set of associated pole elements, said pole elements of aid first and second sets alternating in positions along said body portion of said stator, each of said sets of coils and associated pole elements being subdivided into equal-number subsets of at least two stator coils and pole elements, said pole elements of one of said subsets of each set alternating, in positions about said body portion of said stator, with said pole elements of the other subset of the same set; sensor means having at least two electrical circuit legs, one of aid circuit legs being connected to said first set of coils, at a first junction between said subsets thereof, and the other of said two circuit legs being connected to said second set of coils, at a second junction between said subsets thereof, said first and second sets of coils adapting said associated pole elements to function as sensor pole elements, providing at least two sensor channels for the generation of signals indicative of the position of a rotor assembled with said stator, said signals constituting averaged values of electrical effects produced simultaneously upon a plurality of pole elements; and power supply means connected to said phase coils for providing at least two phases of current, said supply means having one circuit portion connecting a first group of said phase coils wound about a first group of said pole elements in series for energization by one phase of current, and having another circuit portion connecting a second group of said phase coils wound about a second group of said pole elements in series for energization by a second phase of current, said one and another circuit portions of said supply means, so connected, adapting said pole elements to function as first and second phase force-generating pole elements, respectively, the total number of said pole elements on said body portion divided by the number of phases provided by said power supply means being an even number.

* * * * *

UNITED STATES PATENT AND TRADEMARK OFFICE
CERTIFICATE OF CORRECTION

PATENT NO. : 5,329,195
DATED : July 12, 1994
INVENTOR(S) : Ralph W. Horber and Hung D. Vu It is certified that error appears in the above-identified patent and that said Letters Patent is hereby corrected as shown below:

Claim 1, column 10, lines 5 and 33 delete "sad" and substitute therefor --said--.

Claim 18, column 11, line 35 delete "magerial" and substitute therefor --material--; column 12, lines 4 and 13 delete "aid" and substitute therefor --said--.

Signed and Sealed this

First Day of November, 1994

Attest:

BRUCE LEHMAN

Attesting Officer

Commissioner of Patents and Trademarks